United States Patent
Guo et al.

(10) Patent No.: US 9,946,381 B2
(45) Date of Patent: Apr. 17, 2018

(54) DRIVING METHOD FOR LIQUID CRYSTAL PANEL

(71) Applicant: Wuhan China Star Optoelectronics Technology Co., Ltd., Wuhan, Hubei (CN)

(72) Inventors: Chunpeng Guo, Guangdong (CN); Chun-hung Huang, Guangdong (CN); Ying-chi Wang, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 232 days.

(21) Appl. No.: 14/914,660

(22) PCT Filed: Feb. 25, 2016

(86) PCT No.: PCT/CN2016/074576
§ 371 (c)(1),
(2) Date: Feb. 26, 2016

(87) PCT Pub. No.: WO2017/113494
PCT Pub. Date: Jul. 6, 2017

(65) Prior Publication Data
US 2018/0039359 A1    Feb. 8, 2018

(30) Foreign Application Priority Data
Dec. 28, 2015   (CN) .......................... 2015 1 1002638

(51) Int. Cl.
*G06F 3/041*   (2006.01)
*G09G 3/36*    (2006.01)

(52) U.S. Cl.
CPC .......... *G06F 3/0412* (2013.01); *G06F 3/0416* (2013.01); *G09G 3/3688* (2013.01);
(Continued)

(58) Field of Classification Search
CPC ...... G06F 3/0412; G06F 3/0416; G06F 3/044; G09G 3/3688; G09G 2320/0252; G09G 2310/06; G09G 2330/021
See application file for complete search history.

(56) References Cited

U.S. PATENT DOCUMENTS

| | | | | |
|---|---|---|---|---|
| 2014/0049509 A1* | 2/2014 | Shepelev | ................ | G06F 3/044 345/174 |
| 2014/0139480 A1* | 5/2014 | Seo | ........................ | G06F 3/0416 345/174 |

(Continued)

FOREIGN PATENT DOCUMENTS

| CN | 104036736 A | 9/2014 |
|---|---|---|
| CN | 104131402 A | 6/2015 |

(Continued)

*Primary Examiner* — Premal R Patel
(74) *Attorney, Agent, or Firm* — Andrew C. Cheng

(57) ABSTRACT

A driving method for a liquid crystal panel is disclosed. Wherein, the driving method includes: (A) at a moment of switching from a normal display time stage to a touch scanning time stage in a current frame, applying a first over driving voltage to a common electrode of each pixel of a liquid crystal panel; and (B) at a moment of switching from the touch scanning time stage in the current frame to a normal display time stage of a next frame, applying a second over driving voltage to the common electrode of each pixel. According to the method described above a time that the common electrode reaches a present level voltage is shorten in order to effectively improve the poor display and touch problem caused by signal abnormality at moments of switching between a normal display and a touch scanning in an in-cell touch panel.

5 Claims, 2 Drawing Sheets

(52) U.S. Cl.
CPC . *G09G 2310/06* (2013.01); *G09G 2320/0252* (2013.01); *G09G 2330/021* (2013.01)

(56) References Cited

U.S. PATENT DOCUMENTS

| | | | |
|---|---|---|---|
| 2015/0179132 A1* | 6/2015 | Lee | G09G 5/006 345/174 |
| 2017/0126582 A1* | 5/2017 | Hilmo | H04L 47/762 |
| 2017/0336917 A1* | 11/2017 | Noguchi | G06F 3/044 |

FOREIGN PATENT DOCUMENTS

| | | |
|---|---|---|
| CN | 104731402 A | 6/2015 |
| KR | 20140071056 A | 6/2014 |

\* cited by examiner

DRIVING METHOD FOR LIQUID CRYSTAL PANEL

BACKGROUND OF THE INVENTION

1. Field of the Invention

The present disclosure relates to a liquid crystal display technology field, and more particularly to a driving method for a liquid crystal panel.

2. Description of Related Art

Along with the rapid development of the liquid crystal display technology, a touch screen panel is gradually popular in people's life. Currently, a touch panel according to the forming structure can be divided into: an add-on-mode touch panel and an in-cell touch panel. Wherein, the add-on-mode touch panel is a liquid crystal panel that manufactures a touch screen and a liquid crystal display separately, then, combining together to form a liquid crystal display panel having a touch function. The add-on-mode touch panel has shortcomings of high manufacturing cost, low light transmittance and thicker module. The in-cell touch panel embeds a touch electrode of the touch panel inside the liquid crystal display panel. Through above way, a thickness of the module can be thinner, greatly decreasing the manufacturing cost of the touch panel. Therefore, the in-cell touch panel is favored by main panel manufacturers.

Currently, the in-cell touch panel can be divided into a mutual capacitance and a self-capacitance touch panel. Wherein, the self-capacitance touch panel adopts a self-capacitance principle to realize detecting a position of a finger. Specifically, dividing a common electrode ITO (conductive glass) into multiple touching sensors which are isolated with each other. When a human does not touch the panel, a capacitance applied on each touch sensor is a fixed value. When a human touch the panel, a capacitance applied on the touch sensor corresponding to a touch location is the fixed value and a human capacitor. A touch detection chip detects a change of a capacitance of each touch sensor in a touch time stage, a touch position can be determined.

Wherein, in order to realize a display and touch function, for the in-cell touch panel, it requires driving a touch circuit for realizing the touch function and a display circuit for realizing the display in order to respectively realize the touch function and the display function of the touch panel. In the current driving method, performing a scanning in a time-division manner for the touch circuit and the display circuit is usually used. That is, when driving the touch panel to display, a touch operation on the touch panel is stopped. In order to realize the above driving process, in a normal display stage, the common electrode ITO layer functions as a common electrode and a common electrode signal is a direct-current signal. In a touch scanning stage, the common electrode ITO layer functions as multiple touch sensors, and a touch signal is an alternating-current signal. In the switching process of the above two signals (especially in the switching moment), a signal temporary abnormality will generated caused by the signal delay in order to generate various display problems and touch problems.

For example, FIG. 1 shows a schematic diagram of an ideal voltage waveform of an in-cell touch panel. From FIG. 1, in one frame period, a touch sensor and a common electrode are operated in a time-division manner. That is, a portion of time is used for displaying (providing a direct-current signal voltage), and the other portion of time us used for touch scanning (providing an alternating-current signal voltage). However, the schematic diagram shown in FIG. 1 is just an ideal situation. Actually, because many equivalent resistors or capacitors are existed in the in-cell touch panel and the signal line also exists certain of resistance, a delay will exist in a signal transmission process. An actual voltage waveform of an in-cell touch panel is shown in FIG. 2. From FIG. 2, because the reasons described above, when a signal is switched from a voltage level of a normal display stage to a voltage level of touch scanning stage, a certain delay will generate. Similarly, when a signal is switched from a voltage level of touch scanning stage to a voltage level of a normal display stage, a certain delay will also generate. Because of the delay, in a switching moment, a bad picture display or other abnormal phenomenon will generate because of the abnormal signal.

SUMMARY OF THE INVENTION

Accordingly, the purpose of the present disclosure is to provide a driving method for a liquid crystal panel in order to effectively improve the poor display and touch problem caused by signal abnormality at moments of switching between a normal display and a touch scanning in an in-cell touch panel.

According to one aspect of an exemplary embodiment of the present disclosure, providing a driving method for a liquid crystal panel, wherein, the driving method includes: (A) at a moment of switching from a normal display time stage to a touch scanning time stage in a current frame, applying a first over driving voltage to a common electrode of each pixel of a liquid crystal panel; and (B) at a moment of switching from the touch scanning time stage in the current frame to a normal display time stage of a next frame, applying a second over driving voltage to the common electrode of each pixel.

Optionally, the first over driving voltage is a positive value and is 1.2 times to 2 times a preset high level voltage; the second driving voltage is a negative value and an absolute value of a difference value between the second over driving voltage and a preset low level voltage is equal to an absolute value of a difference value between the first over driving voltage and the preset high level voltage.

Optionally, the preset high level voltage is a power source voltage of each pixel, and the preset low level voltage is a ground voltage.

Optionally, the first over driving voltage and the second over driving voltage are applied to the common electrode through a data driver of the liquid crystal panel.

Optionally, the first over driving voltage and the second over driving voltage are applied to the common electrode through an independent voltage source in the liquid crystal panel.

Optionally, the liquid crystal panel is an in-cell liquid crystal panel.

The driving method of the liquid crystal panel according to an exemplary embodiment of the present disclosure can shorten the time that the common electrode reach the preset level voltage in order to effectively improve the poor display and touch problem caused by signal abnormality at moments of switching between a normal display and a touch scanning in an in-cell touch panel.

BRIEF DESCRIPTION OF THE DRAWINGS

Through following to combine figures to describe in detail, the above, the other purposes, the features and benefits of the exemplary embodiment of the present disclosure will become clearer, wherein.

DETAILED DESCRIPTION OF THE PREFERRED EMBODIMENT

The following will refer to the exemplary embodiment of the present disclosure. The example of the embodiment is shown in the figures. Wherein, a same numeral always represents a same part. The following will refer the figures to illustrate the embodiment in order to explain the present disclosure.

Figure 1:
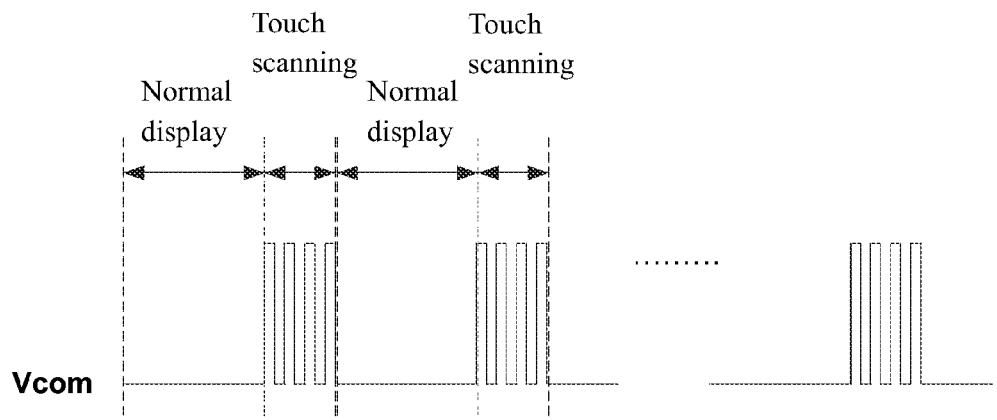
FIG. 1 is a schematic diagram of an ideal voltage waveform of an in-cell touch panel according to the conventional art.
Figure 2:
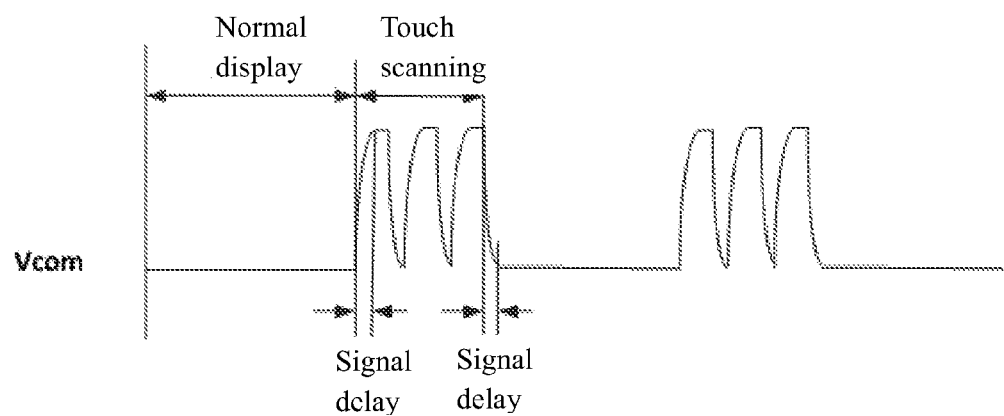
FIG. 2 is a schematic diagram of an actual voltage waveform of an in-cell touch panel according to the conventional art.
Figure 3:
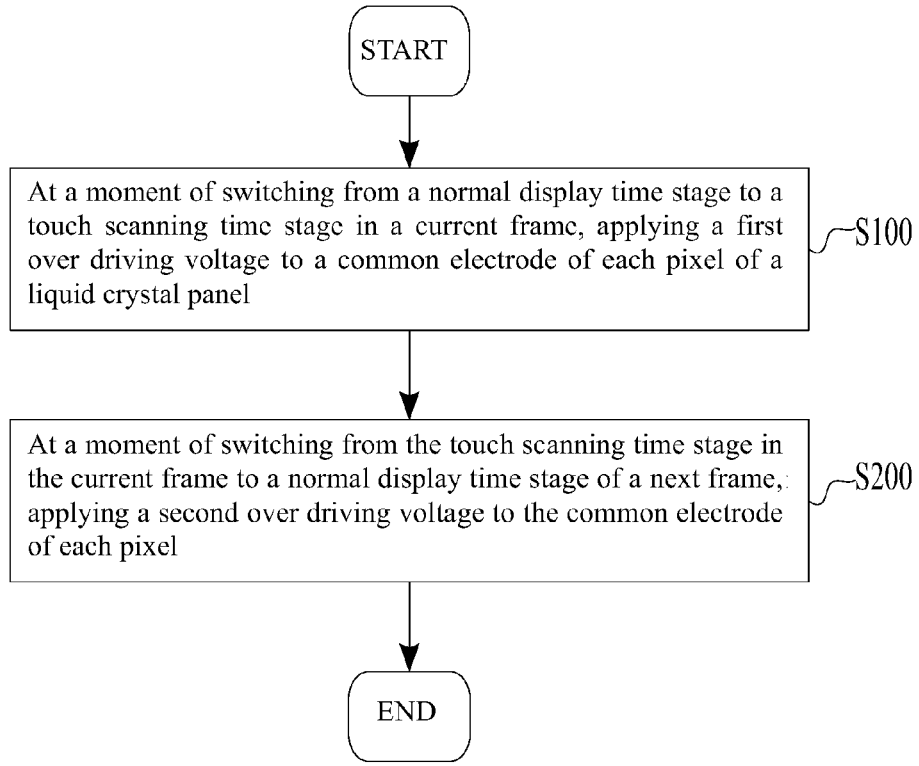
FIG. 3 is a flowchart of a driving method for a liquid crystal panel according to an embodiment of the present disclosure.

FIG. 3 is a flowchart of a driving method for a liquid crystal panel according to an embodiment of the present disclosure. Here, as an embodiment, the liquid crystal panel can be an in-cell liquid crystal panel such as an in-cell touch panel. Besides, it can be understood that the above liquid crystal panel is not limited to an in-cell liquid crystal panel, and can be anyone liquid crystal panel having a touch function such as an add-on-mode touch panel.

As shown in FIG. 3, in a step S100, at a moment of switching from a normal display time stage to a touch scanning time stage in a current frame, applying a first over driving voltage to a common electrode of each pixel of a liquid crystal panel. In a step S200, at a moment of switching from the touch scanning time stage in the current frame to a normal display time stage of a next frame, applying a second over driving voltage to the common electrode of each pixel.

Specifically, as described above, because actually, in a liquid crystal panel, many equivalent resistors or capacitors are existed and the signal line itself also has certain of resistance, at moments of switching different functions of the liquid crystal panel, a temporarily abnormal signal because of a signal delay will generate. Therefore, in an example of the present disclosure, at moments of switching different functions of the liquid crystal panel, applying a larger driving voltage to the common electrode of each pixel of the liquid crystal panel such that the common electrode of each pixel can reach a preset level voltage in a shorter time.

In the present disclosure, a hardware device on the liquid crystal panel can apply the first over driving voltage and the second over driving voltage on the common electrode of each pixel of the liquid crystal panel. For example, using a data driver of the liquid crystal panel to apply the first over driving voltage and the second over driving voltage. Or, the first over driving voltage and the second over driving voltage can be applied through an independent voltage source in liquid crystal panel. In the present disclosure, the first over driving voltage can be applied through a first voltage source, and the second over driving voltage can be applied through a second voltage source. However, one voltage source can respectively apply the first over driving voltage and the second over driving voltage to the common electrode at different moments.

As an example, the first over driving voltage is a positive value and is 1.2 times to 2 times a preset high level voltage. The second driving voltage is a negative value and an absolute value of a difference value between the second over driving voltage and a preset low level voltage is equal to an absolute value of a difference value between the first over driving voltage and a preset high level voltage. Here, the preset high level voltage is a power source voltage of each pixel, and the preset low level voltage is a ground voltage. For example, the preset high level voltage that is the power source voltage of each pixel is 4V, and the preset low level voltage that is the ground voltage is 0V. The first over driving voltage is 1.5 times the preset high level voltage, the first over driving voltage is 6V and the second over driving voltage is −2V.

Figure 4:
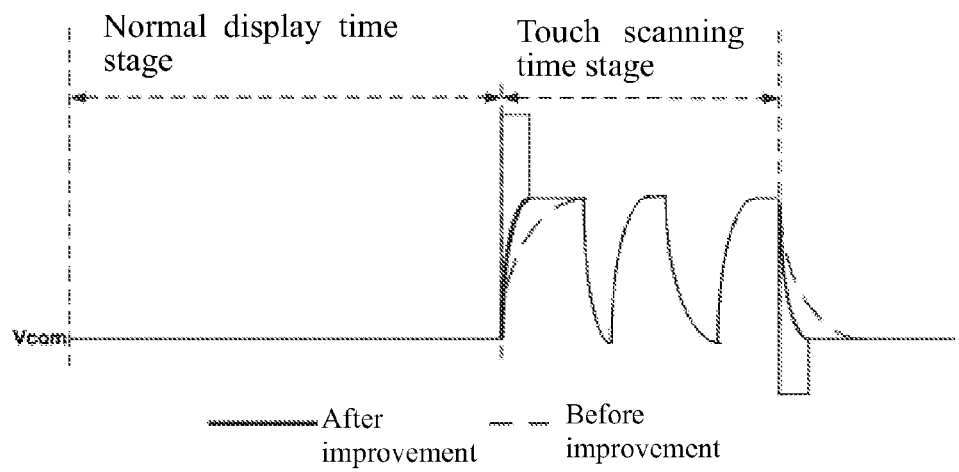
FIG. 4 is a waveform diagram of driving the liquid crystal panel according to an embodiment of the present disclosure.

FIG. 4 shows an example of driving a liquid crystal panel according to an exemplary embodiment of the present disclosure. As shown in FIG. 4, a liquid crystal panel can include multiple frames in a normal display period. Each frame has a preset touch scanning time stage and a normal display time stage. Wherein, a dashed line in FIG. 4 shows a voltage waveform of a liquid crystal panel without applying the driving method of the embodiment of the present disclosure, wherein, because the delay in the signal transmission process caused by the resistance in the liquid crystal panel, the common electrode of each pixel cannot reach a preset level voltage in a preset time. A bold solid line in FIG. 4 shows a voltage waveform of the liquid crystal panel after applying with the driving method of the embodiment of the present disclosure. Wherein, at a moment of switching from a normal display time stage to a touch scanning time stage in a current frame, applying a first over driving voltage to a common electrode of each pixel of a liquid crystal panel, and at a moment of switching from the touch scanning time stage in the current frame to a normal display time stage of a next frame, applying a second over driving voltage to the common electrode of each pixel such that a time that the common electrode reaches the present level voltage is shorten in order to improve the display and touch quality of the liquid crystal panel.

In summary, the driving method of the liquid crystal panel according to an exemplary embodiment of the present disclosure can shorten the time that the common electrode reach the preset level voltage in order to effectively improve the poor display and touch problem caused by signal abnormality at moments of switching between a normal display and a touch scanning in an in-cell touch panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A driving method for a liquid crystal panel, wherein, the driving method comprises:
   (A) at a moment of switching from a normal display time stage to a touch scanning time stage in a current frame, applying a first over driving voltage to a common electrode of each pixel of a liquid crystal panel; and
   (B) at a moment of switching from the touch scanning time stage in the current frame to a normal display time stage of a next frame, applying a second over driving voltage to the common electrode of each pixel; and
   wherein, the first over driving voltage is a positive value and is 1.2 times to 2 times a preset high level voltage;

the second driving voltage is a negative value and an absolute value of a difference value between the second over driving voltage and a preset low level voltage is equal to an absolute value of a difference value between the first over driving voltage and the preset high level voltage.

2. The driving method according to claim 1, wherein, the preset high level voltage is a power source voltage of each pixel, and the preset low level voltage is a ground voltage.

3. The driving method according to claim 1, wherein, the first over driving voltage and the second over driving voltage are applied to the common electrode through a data driver of the liquid crystal panel.

4. The driving method according to claim 1, wherein, the first over driving voltage and the second over driving voltage are applied to the common electrode through an independent voltage source in the liquid crystal panel.

5. The driving method according to claim 1, wherein, the liquid crystal panel is an in-cell liquid crystal panel.

\* \* \* \* \*